(12) United States Patent
Dearth et al.

(10) Patent No.: US 6,744,765 B1
(45) Date of Patent: Jun. 1, 2004

(54) MECHANISM FOR COMPLETING MESSAGES IN MEMORY

(75) Inventors: Glenn A. Dearth, Groton, MA (US); Thomas P. Webber, Petersham, MA (US); Kenneth A. Ward, Shrewsbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 824 days.

(21) Appl. No.: 09/645,864

(22) Filed: Aug. 24, 2000

(51) Int. Cl.$^7$ .............................................. H04L 12/28
(52) U.S. Cl. ...................... 370/394; 370/349; 370/473; 370/474; 709/236; 709/238; 714/748; 714/749
(58) Field of Search ................................ 370/349, 394, 370/473, 474; 709/236, 238; 714/748, 749

(56) References Cited

U.S. PATENT DOCUMENTS

| | | | | |
|---|---|---|---|---|
| 4,058,672 A | * | 11/1977 | Crager et al. ................ | 370/394 |
| 4,777,595 A | * | 10/1988 | Strecker et al. .............. | 709/236 |
| 4,841,526 A | * | 6/1989 | Wilson et al. ............... | 714/748 |
| 5,003,534 A | * | 3/1991 | Gerhardt et al. ............. | 370/322 |
| 5,086,428 A | * | 2/1992 | Perlman et al. .............. | 370/394 |
| 5,386,412 A | * | 1/1995 | Park et al. ................... | 370/270 |
| 5,872,777 A | * | 2/1999 | Brailean et al. ............. | 370/349 |
| 6,044,415 A | * | 3/2000 | Futral et al. .................. | 710/33 |
| 6,453,372 B1 | * | 9/2002 | Mizunuma et al. ........... | 710/52 |
| 6,473,425 B1 | * | 10/2002 | Bellaton et al. ............. | 370/392 |
| 6,529,960 B2 | * | 3/2003 | Chao et al. .................. | 709/238 |
| 6,640,248 B1 | * | 10/2003 | Jorgensen .................... | 709/226 |

FOREIGN PATENT DOCUMENTS

EP 0 969 622 A2 1/2000

OTHER PUBLICATIONS

PCT International Search Reoprt for international application No. PCT/US01/26559; May 30, 2002; pp. 1–4; European Patent Office.

Agilent News datedApr. 10, 2000 entitled "Agilent Technologies Outlines Broad Support Plans For InfiniBand Architecture", one page.

Intel Corporation, 2000, Internet Information Sheet entitled "InfiniBand* Architecture—The Industry's Choice for I/O Architecture", one page.

Intel Developer Forum, "InfiniBand* Technology Prototypes White Paper", eight pages (undated).

Intel Corporation Slideshow entitled "NGIO Architecture Overview", 21 pages (undated).

SunAWorld Internet Information Sheet dated Mar., 2000, entitled "InfiniBand set to emerge as high–speed PCI bus standard", eight pages.

* cited by examiner

Primary Examiner—Wellington Chin
Assistant Examiner—Mark A. Mais
(74) Attorney, Agent, or Firm—Osha & May L.L.P.

(57) ABSTRACT

A method for transmitting messages between two processes includes creating a communications channel between a first channel adapter coupled to a client process and a second channel adapter coupled to a remote process. The method further includes reading a request message at the first channel adapter, segmenting the request message into a series of packets, assigning a sequence number to each packet, and transmitting the packets in order to the second channel adapter through the communications channel. The method further includes receiving the packets at the second channel adapter and sending at least one acknowledgement message to the first channel adapter in response to the received packets. The acknowledgement message has a packet sequence number field containing a packet sequence number and a payload containing a message sequence number, wherein the message sequence number identifies a complete message last received at the second channel adapter and the packet sequence number identifies a packet last received at the second channel adapter.

16 Claims, 6 Drawing Sheets

MECHANISM FOR COMPLETING MESSAGES IN MEMORY

BACKGROUND OF THE INVENTION

Most of today's distributed systems use shared-bus technology, e.g., peripheral component interconnect (PCI) cards, to connect computers to input/output (I/O) modules, e.g., video, graphics, Ethernet, small computer system interface (SCSI). For these distributed systems, there is a practical limit to the number of I/O modules that can be connected to the computer via the shared bus. There is also a limit to how far apart the I/O modules can be from the computer. Furthermore, all communications between the processor/memory complex of the computer and the I/O modules must pass through a single point of contention, the shared bus. All these factors, among others, pose limitations on the scalability, reliability, flexibility, and performance of the system. To address this problem, a group of computing industry leaders recently proposed an I/O architecture, called Infiniband$^{SM}$, which defines a system area network for connecting various components of one or more computer systems. Examples of system area networks are known in the computing world, including High Performance Parallel Interface (HiPPI) and Fiber Channel technologies which are used to connect massively parallel processors to scalable storage servers and data vaults. U.S. Pat. No. 6,044,415 issued to Futral et al. discloses a virtual connection between an application program and an I/O device which is implemented as a system area network.

The Infiniband$^{SM}$ system area network consists of nodes which communicate through a channel-based, switched fabric. Each of the nodes could be a processor node, an I/O subsystem, a storage subsystem, or a router which connects to another network. The switched fabric is made of a collection of switches, routers, and links that connect a set of channel adapters. The channel adapters form an interface between the switched fabric and the nodes. The Infiniband$^{SM}$ system area network can be divided into subnets interconnected by routers. At this level, each Infiniband$^{SM}$ subnet is essentially a switched network. In general, switched networks are considered more scalable, i.e., more capable of growing to large number of nodes, than shared-media networks because of their ability to support many hosts at full speed. Infiniband$^{SM}$ is expected to provide a scalable performance of 500 Mbytes per second (4 Gbits per second) to 6 Gbytes per second (48 Gbits per second) per link.

In Infiniband$^{SM}$, a client process has the ability to place a set of instructions that the hardware executes in a work queue. A client is the requesting program in a client/server relationship, and a process is an instance of a program running on a computer. Each process on a computer runs largely independently of other processes, and the operating system is responsible for making sure that resources, such as address space and CPU cycles, are allocated to all the current processes. The work queue holds instructions that cause data to be transferred between the client's memory and another process in one queue, called the send work queue, and instructions about where to place data that is received from another process in another queue, called the receive work queue. This other process is typically called a remote process, even if it is collocated on the same computer as the client process. The hardware executes the instructions in the order that they were placed in the work queue. For a send operation, messages are sent from the client process to the remote process in the form of a series of data units called packets. The sending hardware (sender) transmits the packets to a receiving hardware (receiver), where they can be accessed by the remote process. For operations such as remote direct memory access (RDMA) read operation, the remote process sends a reply message to the client process which contains the requested information.

Switches are used to route packets between the sender and the receiver. The switches typically route packets using either a datagram (or connectionless) network or a virtual-circuit (or connection-oriented) network. In a datagram network, each packet contains enough information, i.e., destination address, to enable any switch to decide how to get the packet to its destination. In a virtual-circuit network, a virtual connection is first set up between the source host and the destination host. This virtual connection may be set up by a network administrator. Alternatively, a host can send messages into the network to cause the state to be established. In a datagram-based network, a sequence of packets sent from a source host to a destination host may take different paths. Infiniband$^{SM}$ also supports a form of datagram-based network which is based upon explicit setup of switch routing tables by the subnet manager. In a virtual-circuit network, a sequence of packets sent from a source host to a receiver host takes the path established by the virtual circuit.

Infiniband$^{SM}$ provides reliable transport services between client and remote processes using a combination of packet sequence numbers (PSNs) and acknowledgement (ACK) messages. That is, each packet sent to the receiver is assigned a PSN, and the receiver sends an ACK message to the sender acknowledging receipt of the packet. A negative ACK (NAK) message is sent for dropped or lost packets. The ACK messages tell the sender what packets have been received at the remote end by providing the PSN of the received packet. A message is completed when all the outstanding packets for the message have been acknowledged. However, with just the returned PSNs, the sender has no effective way of knowing when the message has been completed. To determine when a message has been completed, the sender reads a descriptor in the client's memory space, for every returned PSN, to determine the size of the original message, i.e., the number of packets in the original message. Then the sender uses this information along with the PSN to determine whether the message has been completed. These extra reads of descriptors translate into additional system bus overhead on top of the data movement between the processor and memory. Schemes to minimize this overhead can significantly improve system performance.

SUMMARY OF THE INVENTION

In one aspect, the invention relates to a system of transmitting messages between a client process and a remote process which comprises a system area network providing a communications channel between the client process and the remote process. The system further includes a first channel adapter forming an interface between the client process and the communications channel. The first channel adapter is configured to receive a message from the client process, segment the message into a series of packets, assign a sequence number to each packet, and place the packets in order on the communications channel. The system further includes a second channel adapter forming an interface between the remote process and the communications channel. The second channel adapter is configured to receive packets from the communications channel and send at least one acknowledgement message to the first channel adapter in response to the received packets. The acknowledgement message has a packet sequence number field containing a packet sequence number and a payload containing a message sequence number. The message sequence number identifies a complete message last received at the second channel adapter, and the packet sequence number identifies a packet last received at the second channel adapter.

In some embodiments the client process has a work queue in which instructions to be executed by a communications interface are placed. In some embodiments the work queue comprises a send work queue in which messages to be sent to the remote process are placed, and the first channel adapter reads a message from the send work queue. In some embodiments the work queue further includes a receive work queue in which instructions about where to place a reply message received from the second channel adapter are placed.

In another aspect, the invention relates to a method of transmitting messages between two processes which comprises creating a communications channel between a first channel adapter coupled to a client process and a second channel adapter coupled to a remote process. At the first channel adapter, the method further includes reading a request message from the client process, segmenting the request message into a series of packets, assigning a sequence number to each packet, and transmitting the packets in order to the second channel adapter through the communications channel. At the second channel adapter, the method further includes receiving the packets from the first channel adapter and sending at least one acknowledgement message to the first channel adapter in response to the received packets, the acknowledgement message having a packet sequence number field containing a packet sequence number and a payload containing a message sequence number, wherein the message sequence number identifies a complete message last received at the second channel adapter and the packet sequence number identifies a packet last received at the second channel adapter.

Other aspects and advantages of the invention will be apparent from the following description and the appended claims.

DETAILED DESCRIPTION OF THE INVENTION

Figure 1:
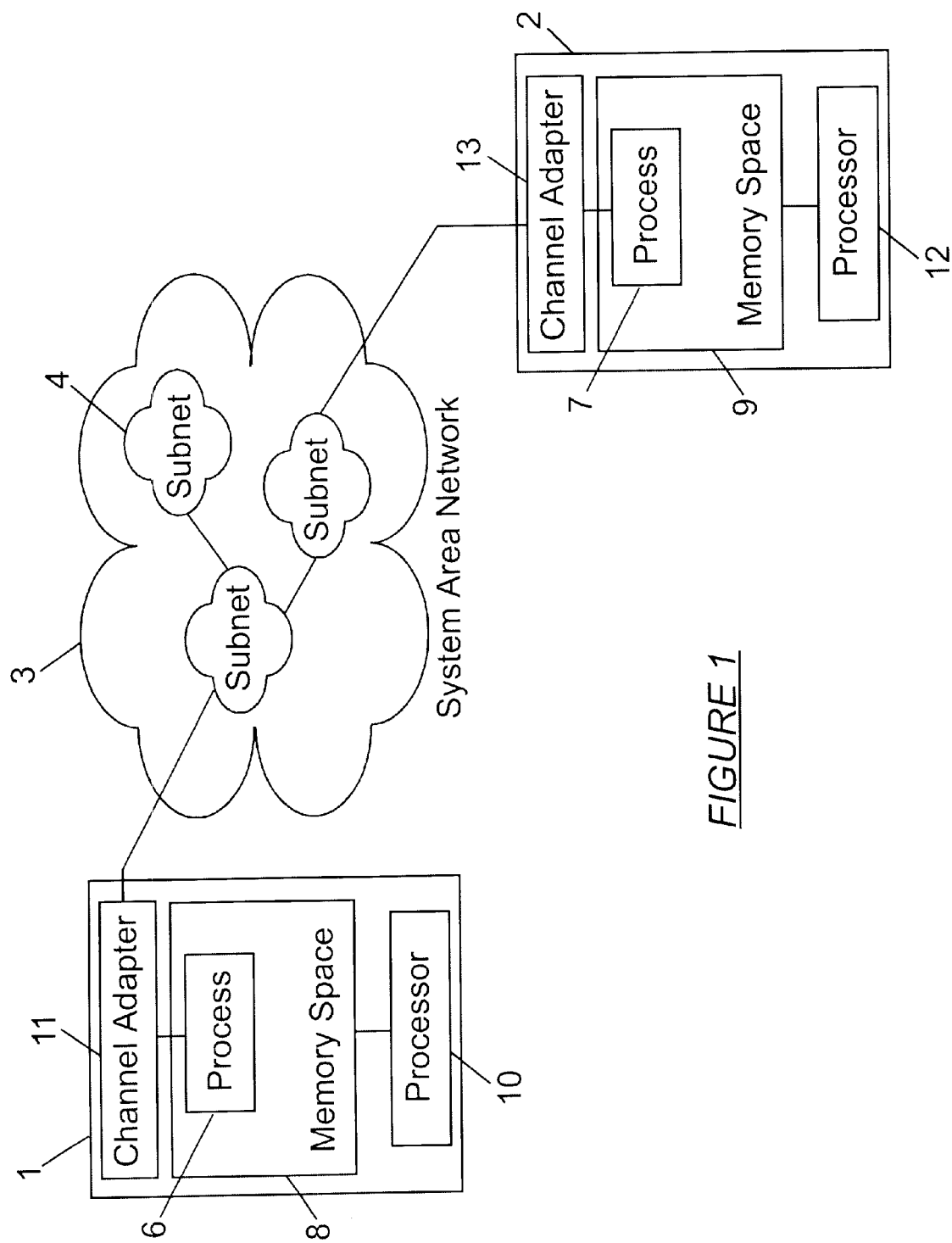
FIG. 1 schematically depicts a client node and a remote node attached to a system area network.

Various embodiments of the invention will now be described with reference to the accompanying drawings. FIG. 1 schematically depicts a client node 1 and a remote node 2 attached to a system area network 3. The client and remote nodes 1, 2 may be any subsystem that can be attached to the system area network 3, e.g., a parallel computer, a redundant array of independent disks (RAID) subsystem, an I/O subsystem, a scalable storage server, etc. The system area network 3 comprises interconnected subnets 4. Each subnet 4 is made up of a set of interconnected switches (not shown), a router (not shown), and a subnet manager (not shown). The system area network 3 provides a communications channel (5 in FIG. 2) between a client process 6 on the client node 1 and a remote process 7 on the remote node 2. The client process 6 is located in a memory space 8 on the client node 1, and the remote process 7 is located in a memory space 9 on the remote node 2. The client node 1 includes a processor 10 which interacts with the memory space 8 and a logic called channel adapter 11 which forms an interface between the client process 6 and the system area network 3. The remote process 7 includes a processor 12 which interacts with the memory space 9 and a logic called channel adapter 13 which forms an interface between the remote process 7 and the system area network 3. The channel adapters 11, 13 may be implemented in an application-specific integrated circuit. The client node 1 and the remote node 2 may each include more than one processor and channel adapter.

Figure 2:
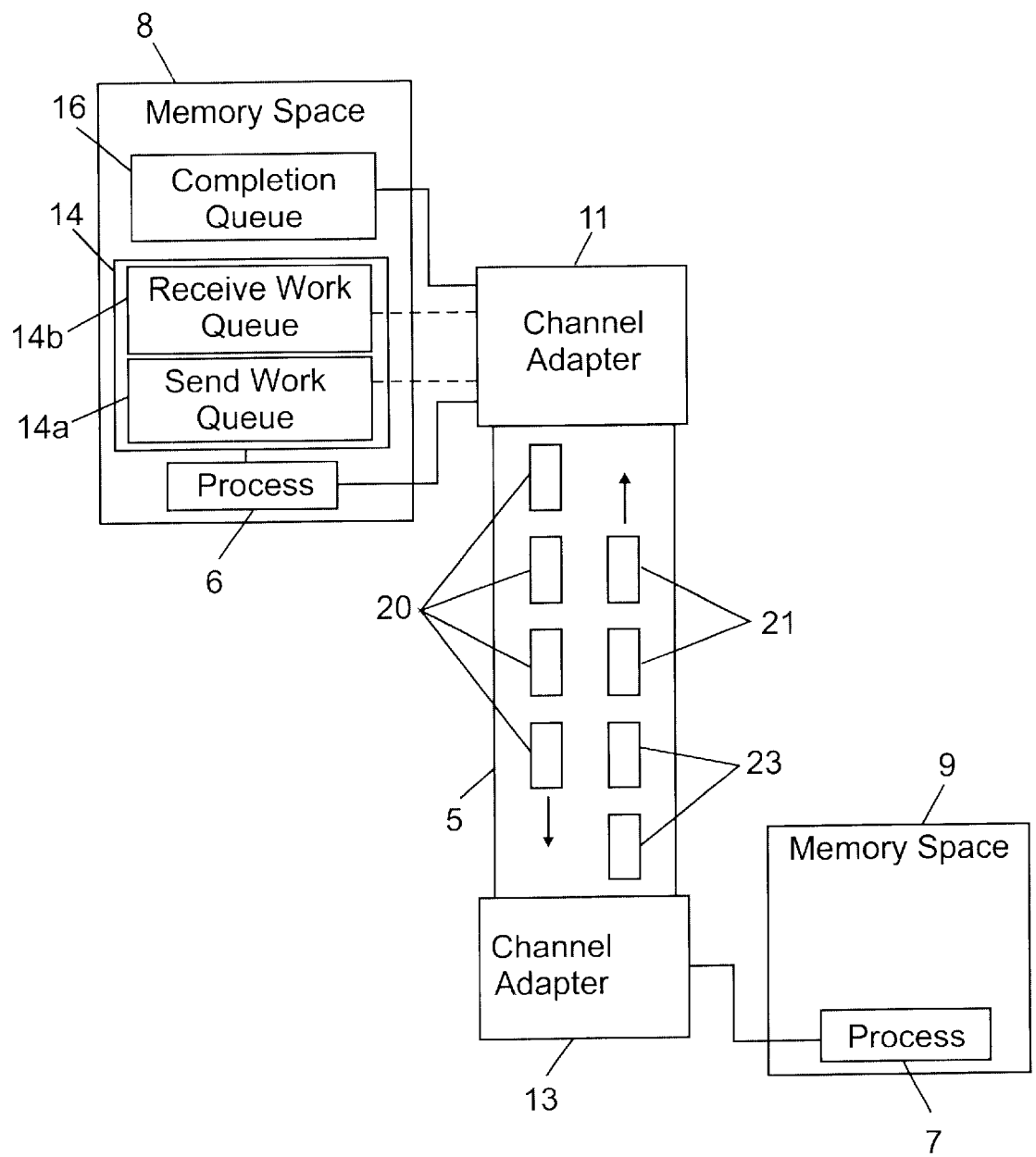
FIG. 2 schematically depicts a client process connected to a remote process by a communications channel provided by the system area network of FIG. 1.

FIG. 2 shows the client process 6 and the remote process 7 connected by a communication channel 5. A work queue 14 provided in the memory space 8 of the client node 1. Although only one work queue 14 is shown, it should be clear that there may be multiple work queues in the memory space 8. When the client process 6 submits a work request, an instruction called a work queue element is placed on the work queue 14. The work queue 14 includes a send work queue 14a and a receive work queue 14b. The work queue elements that cause data to be transferred between the memory spaces 8, 9 are placed on the send work queue 14a, and the work queue elements that include instructions about where to place data that is received from the memory space 9 are placed on the receive work queue 14b. A communications interface, which may be the processor 10 (shown in FIG. 1) or the channel adapter 11 or other processor on the client node 1 (shown in FIG. 1), e.g., an I/O processor (not shown), executes the work queue elements in the order they were placed on the work queue 14.

The basic unit of communication between the client process 6 and the remote process 7 is a message. A message can be a send or receive operation, a remote direct memory access (RDMA) read or write operation, an atomic operation, or a multicast operation. For a send operation, the work queue element specifies a block of data in the memory space 8 to be sent to the remote node 2, leaving the remote node 2 to determine where to place the received data. For a receive operation, the work queue element specifies where to place data in the memory space 8. A RDMA operation is a direct exchange of data between the memory spaces 8 and 9. For a RDMA operation, the work queue element specifies an address in the memory space 9 where data is to be placed. For RDMA-read operation, a work queue element in the send work queue 14a indicates that data is to be transferred from the memory space 9 to the memory space 8. For RDMA-write operation, a work queue element on the send work queue 14a indicates that data is to be transferred from the memory space 9 to the memory space 8. It should be noted that work queue elements are not needed in the memory space 9 for RDMA operations. An atomic operation stipulates that the hardware is to perform a read of a location in the memory space 9 and update the contents in the location. Atomic operation is transaction-based and can be undone if necessary. A multicast operation involves sending a message to the remote node 2 which may be delivered to multiple ports or nodes.

Messages from the client process 6 are sent to the remote process 7 when the instructions on the send work queue 14a are executed by the communications interface, e.g., the processor 10 (shown in FIG. 1) or the channel adapter 11 or other processor on the client node 1 (shown in FIG. 1). Messages from the remote process 7 are received by the client process 6 when the instructions on the receive work queue 14b are executed by the communications interface. The mechanism for transmitting messages between the client process 6 and the remote process 7 comprises the communications channel 5 and the channel adapters 11, 13. The messages to be sent to the remote process 7 are transferred from the memory space 8 to the channel adapter 11, and the messages to be received from the remote process 7 are transferred from the channel adapter 11 to the memory space 8. The channel adapter 11 may be configured to directly read messages from and write messages into the memory space 8 without involvement of a work element in the receive work queue 14b. In this case, the receive work queue 14b gives the channel adapter 11 a pair of buffer descriptor lists. One of the pair of buffer descriptor lists specifies the address/length of buffers containing the data to be transmitted out of the memory space 8. The other buffer descriptor list specifies the address/length of buffers in the memory space 8 into which data are to be placed. The processor 10 (shown in FIG. 1) or other processor on the client node 1 (shown in FIG. 1) may alternatively transfer data between the memory space 8 and the channel adapter 11. In this case, the channel adapter 11 would include a memory for temporarily storing the data to be transferred between the channel adapter 11 and the memory space 8.

Figure 3:
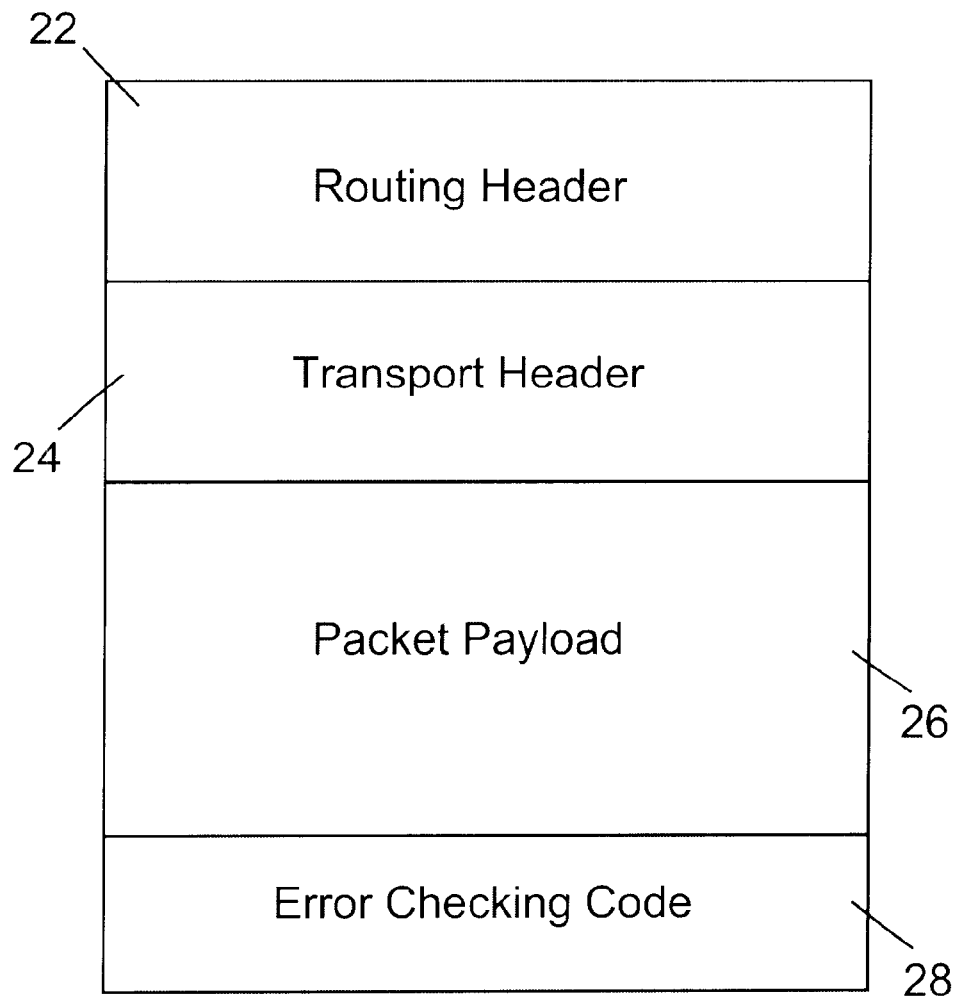
FIG. 3 is a graphical illustration of a packet structure in accordance with one embodiment of the invention.

Regardless of the mechanism used to transfer data between the channel adapter 11 and the memory space 8, the channel adapter 11 generally segments each message to be transmitted over the communications channel 5 into a series of data units 20 called packets. The messages may be segmented in the memory space 8 or, if the channel adapter 11 includes a memory, in the memory of the channel adapter 11. As illustrated graphically in FIG. 3, each packet 20 includes a routing header 22, a transport header 24, a packet payload 24, and an error-detecting code 28, e.g., checksum or cyclic redundancy check (CRC). The routing header 22 includes a source address and a destination address of the packet 20. The transport header includes among other things a packet sequence number (PSN) field and Flags field. The Flags field is used to relay information between the channel adapters 11 and 13. The packet payload 24 contains the actual data that will be used by the remote process 7. The error-detecting code 28 is used to verify the integrity of the packet 20 at the receiving end. The channel adapter 11 (shown in FIGS. 1 and 2) gives each packet 20 in a message a PSN. The PSN is stored in the PSN field of the packet.

Returning to FIG. 2, the communications channel 5 may be a virtual circuit (or connection-oriented network) which interconnects the channel adapters 11 and 13. Alternatively, the communications channel 5 may be a datagram-based network. All Infiniband[SM] service types require explicit setup of switch routing tables by the subnet manager. The connection setup between the channel adapters 11 and 13 could be asymmetric or symmetric. If the connection setup is asymmetric, one side, e.g., the channel adapter 11, is active and the other side, e.g., the channel adapter 13, is passive, or vice versa. The active side makes an open call to the passive side and both sides engage in an exchange of messages to establish the connection. If the connection setup is symmetric, both sides are active and both sides try to open the connection at the same time. A connection manager (not shown) typically manages the connection setup between the channel adapters 11 and 13. Once the connection is established between the channel adapter 11 and 13, messages can be transmitted between the channel adapters 11 and 13 through the communications channel 16. A program running on the communications interface, e.g., the processor 10 (shown in FIG. 1) or the channel adapter 11 or other processor on the client node 1, e.g., an I/O processor, reads work queue elements in the order they were placed on the work queue 14. The program processes the work queue elements on the send work queue 14a by instructing the channel adapter 11 to send messages to the remote process 7 and the work queue elements on the receive work queue 14b by instructing the channel adapter 11 to receive messages from the remote process 7.

The channel adapter 11 reads a message to be sent to the remote process 7, segments the message into packets, e.g., packets 20, assigns a PSN to each packet 20, and sends the packets 20 in order to the channel adapter 13. The channel adapter 13 receives the packets 20 and places them in the memory space 9, where they can be accessed by the remote process 7. The channel adapter 13 acknowledges receipt of the packets 20 by sending acknowledgement (ACK) messages, e.g., ACK packet 21, to the channel adapter 11. The ACKs are transmitted to the channel adapter 11 over the same communications channel 5. For RDMA-read operations, the channel adapter 13 sends reply messages, e.g., reply messages 23, to the client process 6. The channel adapter 13 sends the reply messages to the channel adapter 11 over the communications channel 5. When the channel adapter 11 receives a reply message from the remote process 7, the channel adapter 11 stores the reply message in the memory address indicated by information in the original send descriptor.

Figure 4:
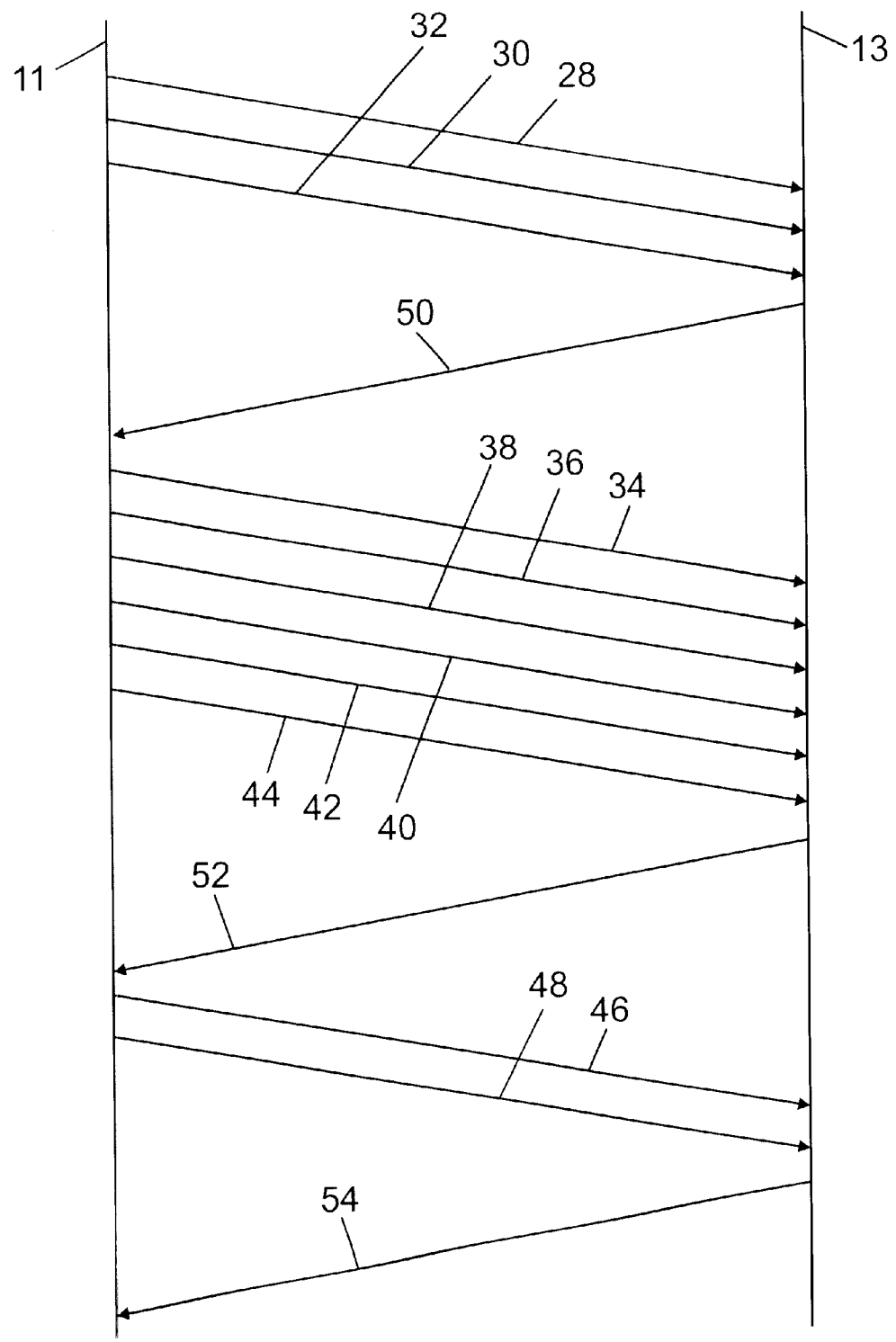
FIG. 4 shows packets transmitted between channel adapters in accordance with one embodiment of the invention.

FIG. 4 illustrates how the channel adapter 11 sends messages to the channel adapter 13. Suppose that there are three messages are to be sent to the remote process 7. Further assume that the channel adapter 11 segments the first message into three packets 28–32, the second message into six packets 34–44, and the third message into two packets 46–48. The channel adapter 11 assigns a PSN to each of the packets 28–32. For example, the PSNs for the packets 28–32 may be 1 through 3, respectively, the PSNs for the packets 34–44 may be 4 through 9, respectively, and the PSNs for the packets 46 and 48 may be 10 and 11, respectively. The PSNs are stored in the PSN fields of the packets. The packets 28–48 are then transmitted to the channel adapter 13 in order. The channel adapter 13 may generate an ACK for each packet received. The channel adapter 13 may send an ACK to the channel adapter 11 after receiving each packet. Alternatively, the channel adapter 13 may coalesce multiple ACKs into a single ACK packet, which is then transmitted to the channel adapter 13. This alternative method minimizes bandwidth usage. The structure of the ACK packet is similar to the one illustrated in FIG. 3. The PSN field of each ACK sent to the channel adapter 11 contains the PSN of the last successfully received packet.

In the illustration shown in FIG. 4, an ACK 50 is sent to the channel adapter 11 after receiving all the packets 28–32 in the first message, an ACK 52 is sent to the channel adapter 11 after receiving all the packets 34–44 in the second message, and an ACK 54 is sent to the channel adapter 11 after receiving all the packets 46–48 in the third message.

The PSN field of the ACK 50 contains the PSN of the packet 32, the PSN field of the ACK 52 contains the PSN of the packet 44, and the PSN field of the ACK 54 contains the PSN of the packet 48. In addition to the PSN information, the payload of each of the ACKs 50–54 contains a message sequence number (MSN). The channel adapter 13 uses the MSN to notify the channel adapter 11 of the end of a message. The channel adapter 13 knows when a message is completed because a flag is set in the header of the packet if the packet is the last one in the message. For example, flags are set in the headers of the packets 32, 44, and 48 which indicate that these packets are the last ones in their respective messages. When the channel adapter 11 receives ACKs, the channel adapter 11 examines the payload of the ACK to determine whether a message has been completed.

For the example in FIG. 4, when the channel adapter 13 first receives a packet from the channel adapter 11, e.g., the packet 28, the channel adapter 13 may generate an ACK (not shown) and initialize the payload of the ACK to some initial value. When the channel adapter 13 receives the second packet 30, the channel adapter 13 may generate an ACK (not shown) and again initialize the payload of the ACK to the same initial value used for the first packet 28. When the channel adapter 13 receives the third packet 32, the channel adapter 13 sees a flag set in the header of the packet 32 which indicates that this is the last packet in the first message. The channel adapter 13 generates an ACK for the packet 32, but this time, the channel adapter 13 writes a starting MSN in the payload of the ACK. This ACK, which is identified as ACK 50 in FIG. 4, is then transmitted to the channel adapter 11. When the channel adapter 11 receives the ACK 50, the channel adapter 11 inspects the ACK payload and deduces from the MSN in the ACK payload that the first message has been completed. It should be noted that the PSN field of the ACK 50 contains the PSN of the packet 32. Thus, the channel adapter 11 assumes that the preceding packets 28 and 30 have been successfully received by the channel adapter 13. This type of assumption is valid in a connection-oriented network, where packets arrive at the channel adapter 13 in the order the channel adapter 11 sent them.

In order for the channel adapter 11 to know which message has been completed, the channel adapters 11, 13 must agree on the starting MSN that the channel adapter 13 will use. This starting MSN is established at the time the connection is made between the channel adapters 11, 13. For example, the connection manager (not shown) may give the channel adapters 11, 13 the starting MSN to use. Alternatively, the channel adapters 11, 13 may exchange messages to establish a starting MSN. The channel adapters 11, 13 may also agree to always start at some MSN, for example, zero. The MSN may be generated using any suitable method as long as the channel adapters 11, 13 both know how the MSN is generated. In one embodiment, the MSN is a monotonically increasing sequence number which is generated by modulo arithmetic. The MSN could be generated, for example, by a modulo $2^{24}$ counter, which counts sequentially from zero and wraps (returns to zero) at $2^{24}$. It should be noted that the ACK payload must have at least 24 bits to hold the MSN in this case.

Assume for discussion purposes that the ACK payload is initialized to $2^{24}$ ($FFFFF_{16}$) and that the starting MSN is 0. Then, for the first packet 28, the channel adapter 13 will generate an ACK having a PSN=1 and a payload $FFFFFF_{16}$. For the second packet 30, the channel adapter 13 will generate an ACK having a PSN=2 and a payload=$FFFFFF_{16}$. For the third packet 32, which is the last packet in the first message, the channel adapter 13 will generate an ACK, i.e., ACK 50, having a PSN=3 and a payload=1. It should be noted that the channel adapter 13 generates the ACK 50 only if the packets 28 and 30 were successfully received. Table 1 below summarizes the content of the PSN field and payload of the ACKs generated for each packet received by the channel adapter 13 assuming that the starting MSN is 0 and the channel adapter 13 generates an ACK for every received packet.

TABLE 1

PSN field and Payload for ACKs

| PSN field | Payload (MSN) |
| --- | --- |
| 1 | $FFFFFF_{16}$ |
| 2 | $FFFFFF_{16}$ |
| 3 | 0 |
| 4 | 1 |
| 5 | 1 |
| 6 | 1 |
| 7 | 1 |
| 8 | 1 |
| 9 | 1 |
| 10 | 2 |
| 11 | 2 |

If the channel adapter 13 generates an ACK only when a message is completed, then the ACKs received by the channel adapter 11 will be as shown in Table 2.

TABLE 2

PSN field and Payload for ACKs

| ACK | PSN field | Payload (MSN) |
| --- | --- | --- |
| 50 | 1 | 0 |
| 52 | 2 | 1 |
| 54 | 3 | 2 |

The channel adapter 11 examines the payload of the ACKs it receives, as previously described. When the ACK payload changes, the channel adapters 11 knows that a message has been completed. For each completed message, the channel adapter 11 notifies the processor 10 (shown in FIG. 1) or other processor on the client node 1 (shown in FIG. 1) of the completion of the message. For each completed message, a complete work queue element is placed in a completion queue 16 (shown in FIG. 2) in the memory space 8.

Thus far, only a well-behaved case in which all the packets transmitted to the channel adapter 13 are successfully received the first time has been considered. In some cases, one or more of the packets sent to the channel adapter 13 may become corrupted. A corrupted packet is typically referred to as a lost packet. In such cases, the channel adapter 11 has to resend the lost packet to the channel adapter 13. The channel adapter 13 notifies the channel adapter 11 of a lost packet by sending a negative acknowledgement (NAK) packet to the channel adapter 11. A flag is set in the NAK to indicate that the information carried by the NAK is related to a lost packet. The channel adapter 11 uses the PSN in the PSN field of the NAK and the MSN in the payload of the NAK to determine the packets to retransmit to the channel adapter 13.

Figure 5:
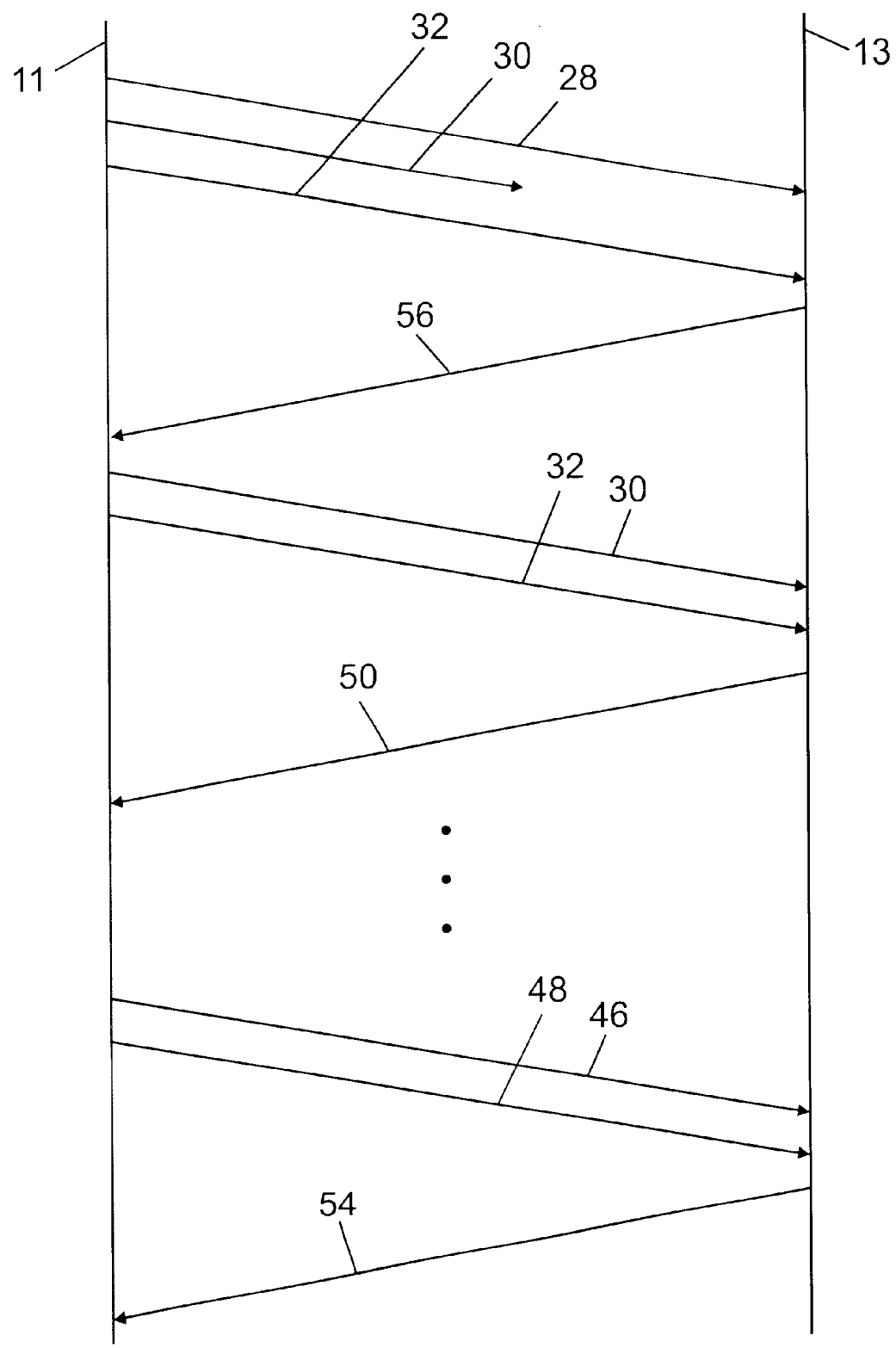
FIG. 5 illustrates a communication process between the channel adapters shown in FIG. 4 including a lost packet and a process for resending a lost packet.

Referring to FIG. 5, assume that the second packet 30 of the first message was not successfully received by the channel adapter 13. The channel adapter 13, upon receipt of the third packet 32, generates a NAK 56 for the second packet 30 that was not successfully received. The PSN field of the NAK 56 contains the PSN of the last packet successfully received before the lost packet. The last packet successfully received before the lost packet in this case is packet 28. Thus, the PSN field of the NAK 56 would contain 1. The payload of the NAK 56 would also be set to the payload of the packet 28, i.e., $FFFFFF_{16}$. When the channel adapter 11 receives the NAK 56, the channel adapter 11 knows that the packet sent after a packet having a PSN=1 and a MSN=0 was not successfully received. It should be noted that the channel adapter 11 knows that the lost packet belongs to the first message, i.e., MSN=0, because the NAK payload is initialized to $FFFFFF_{16}$. The channel adapter 11 retransmits all the packets sent after the packet having a PSN=1 and a MSN=0.

Figure 6:
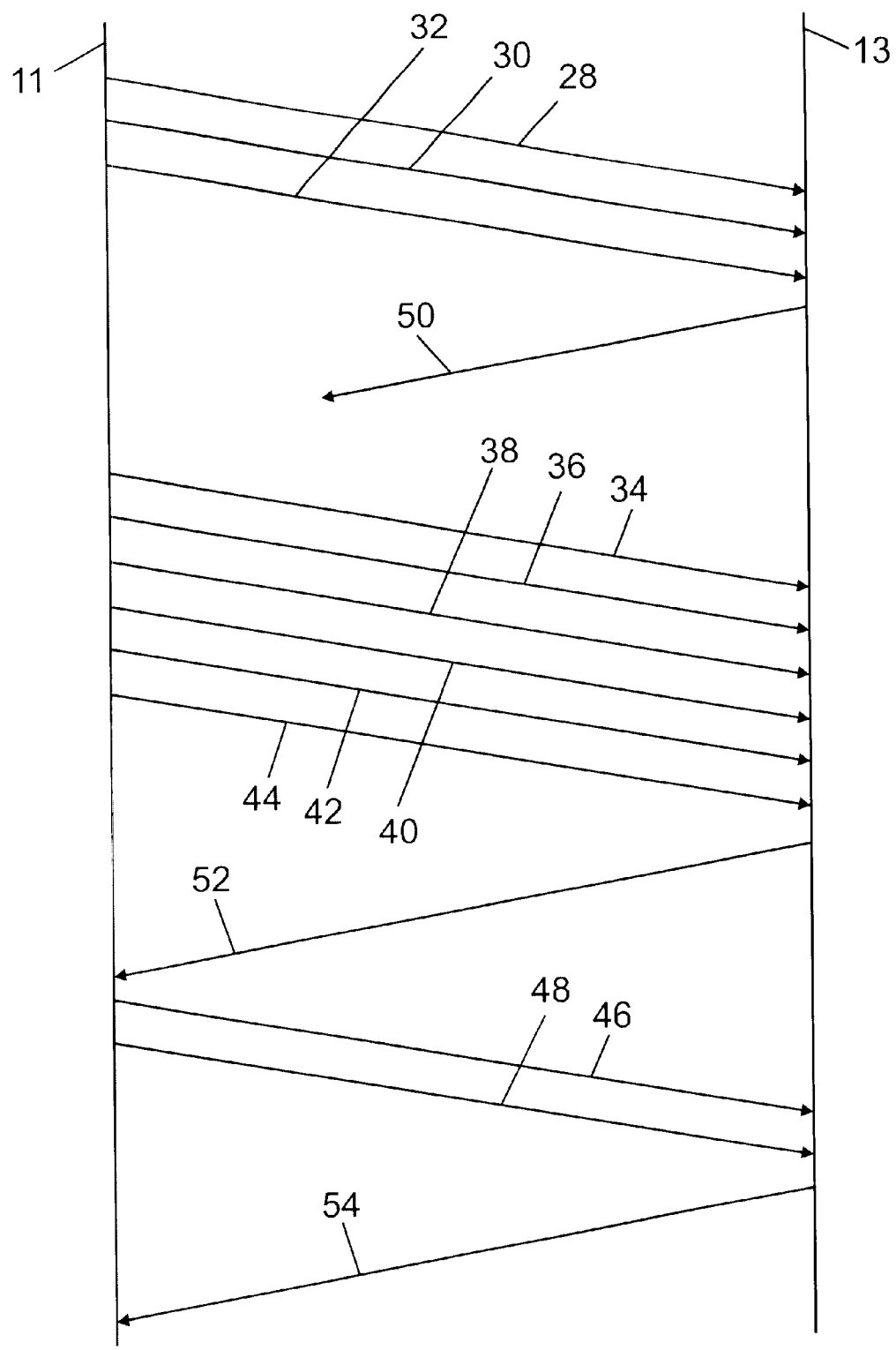
FIG. 6 illustrates a communication process between the channel adapters shown in FIG. 4 including a lost acknowledgement message.

In another scenario, an ACK sent by the channel adapter 11 to the channel adapter 13 may also get lost. In this case, however, it is not necessary to retransmit the ACK because receipt of packets can be implied from subsequent successfully transmitted ACKs. Thus, for example, if the ACK 50 is lost and the ACK 52 is successfully received by the channel adapter 11, as shown in FIG. 6, the channel adapter 11 can infer that because the second message was successfully received by the channel adapter 13, the first message must also have been successfully received by the channel adapter 13. The channel adapter 11 then notifies a processor, e.g., the processor 10 (shown in FIG. 1), that the first and second messages have been completed. Alternatively, the channel adapter 11 may only notify the processor that the second message has been completed, and the processor may then have to check descriptors in memory to see if the first message has been completed.

FIG. 4 illustrates one method for transmitting packets from the channel adapter 11 to the channel adapter 13. However, there are other methods which may be used in transmitting packets between the channel adapters 11, 13. One method, called stop-and-wait, involves sending a packet to the channel adapter 13 and waiting for the channel adapter 13 to acknowledge receipt of the packet before sending another packet. This transmission mechanism is useful in a datagram-based network. A response time is established within which the channel adapter 13 must acknowledge receipt of the packet. If the channel adapter 13 does not acknowledge receipt of the packet within the response time, the channel adapter 11 resends the packet to the channel adapter 13. Another method, called sliding window, allows the channel adapter 11 to transmit multiple packets up to the size of a selected window before receiving an ACK. As ACKs are returned for those packets in the window that were sent first, the window slides, allowing more packets to be sent. The channel adapter 11 examines the ACK payload, as previously described, to determine when a message has been completed.

Embodiments of the invention provide a mechanism for completing messages in memory for a client process and a remote process linked by a reliable connection. The mechanism makes use of the fact that the receiver of the message, e.g., the channel adapter 13, knows when a message is completed because a flag is set in the packet header. Using a MSN, the receiver can then notify the message sender, e.g., the channel adapter 11, of the completion of the message. In this way, the sender does not need to go into memory to read a descriptor for every ACK that it receives. Because message completion checks are made on message boundaries rather than on packet boundaries, the performance of the system is optimized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system of transmitting messages between a client process and a remote process, comprising:

a system area network providing a communications channel between the client process and the remote process;

a first channel adapter forming an interface between the client process and the communications channel, the first channel adapter being configured to receive a message from the client process, segment the message into a series of packets, assign a sequence number to each packet, and place the packets in order on the communications channel; and a second channel adapter forming an interface between the remote process and the communications channel, the second channel adapter being configured to receive packets from the communications channel and send at least one acknowledgement message to the first channel adapter in response to the received packets, the acknowledgement message having a packet sequence number field containing a packet sequence number and a payload containing a message sequence number, wherein the message sequence number identifies a complete message last received at the second channel adapter and the packet sequence number identifies a packet last received at the second channel adapter.

2. A system of transmitting messages between a client process and a remote process, the client process having a work queue in which instructions to be executed by a communications interface are placed, the work queue comprising a send work queue in which messages to be sent to the remote process are placed, the system comprising:

a system area network providing a communications channel between the client process and the remote process;

a first channel adapter forming an interface between the client process and the communications channel, the first channel adapter being configured to read a message from the send work queue, segment the message into a series of packets, assign a sequence number to each packet, and place the packets in order on the communications channel; and a second channel adapter forming an interface between the remote process and the communications channel, the second channel adapter being configured to receive packets from the communications channel and send at least one acknowledgement message to the first channel adapter in response to the received packets, the acknowledgement message having a packet sequence number field containing a packet sequence number and a payload containing a message sequence number, wherein the message sequence number identifies a complete message last received at the second channel adapter and the packet sequence number identifies a packet last received at the second channel adapter.

3. The system of claim 2, wherein the work queue further includes a receive work queue in which instructions about where to place a reply message received from the second channel adapter are placed.

4. A method of transmitting messages between two processes, comprising:

creating a communications channel between a first channel adapter coupled to a client process and a second channel adapter coupled to a remote process;

at the first channel adapter, reading a request message from the client process, segmenting the request message into a series of packets, assigning a sequence number to each packet, and transmitting the packets in order to the second channel adapter through the communications channel; and at the second channel adapter, receiving the packets from the first channel adapter and sending at least one acknowledgement message to the first channel adapter in response to the received packets, the acknowledgement message having a packet sequence number field containing a packet sequence number and a payload containing a message sequence number, wherein the message sequence number identifies a complete message last received at the second channel adapter and the packet sequence number identifies a packet last received at the second channel adapter.

5. The method of claim 4, further comprising the first channel adapter using the message sequence number in the acknowledgement message to determine whether all the packets in the message transmitted to the second channel adapter have been received.

6. The method of claim 5, further comprising the first channel adapter notifying the client process of the completion of the message.

7. The method of claim 4, wherein creating a communications channel between the first channel adapter and the second channel adapter includes establishing a starting message sequence number.

8. The method of claim 7, wherein sending at least one acknowledgement message to the first channel adapter includes the second channel adapter writing the starting message sequence number into the payload of the acknowledgement upon receiving the last packet in the message from the first channel adapter.

9. The method of claim 7, wherein sending at least one acknowledgement message to the first channel adapter includes sending a negative acknowledgement message to the first channel adapter if a packet is not successfully received at the second channel adapter.

10. The method of claim 9, wherein the first channel adapter determines the packet not successfully received at the second channel adapter from the packet sequence number and the message sequence number of the negative acknowledgement message and retransmits the packet.

11. The method of claim 4, wherein the second channel adapter generates an acknowledgement message for every packet received from the first channel adapter.

12. The method of claim 11, wherein the second channel adapter coalesces acknowledgement messages for multiple packets into a single acknowledgement message.

13. The method of claim 4, wherein reading a request message from the client process includes specifying a location in a memory space of the client process in which the request message is stored.

14. The method of claim 13, wherein reading a request message from the client process further includes specifying a location in the memory space of the client process in which to write a reply to the request message.

15. The method of claim 13, wherein reading a request message from the client process further includes specifying a location in the memory space of the remote process in which to write the request message.

16. The method of claim 4, wherein the communications channel is created in a system area network.

* * * * *